CLASS "D" LINEAR AUDIO AMPLIFIER

Original Filed Nov. 14, 1969 5 Sheets-Sheet 1

INVENTOR.
JAMES A. ROSS
BY Harry R. Lubcke
AGENT

CLASS "D" LINEAR AUDIO AMPLIFIER

Original Filed Nov. 14, 1969 5 Sheets-Sheet 2

INVENTOR.
JAMES A. ROSS
BY Harry R. Lubke
AGENT

CLASS "D" LINEAR AUDIO AMPLIFIER

Original Filed Nov. 14, 1969 5 Sheets-Sheet 3

INVENTOR.
JAMES A. ROSS
BY Harry R. Lubcke
AGENT

CLASS "D" LINEAR AUDIO AMPLIFIER

Original Filed Nov. 14, 1969 5 Sheets-Sheet 4

INVENTOR.
JAMES A. ROSS

BY Harry R. Lubcke
AGENT

CLASS "D" LINEAR AUDIO AMPLIFIER

Original Filed Nov. 14, 1969 5 Sheets-Sheet 5

INVENTOR.
JAMES A. ROSS
BY Harry R. Lubcke
AGENT

United States Patent

Re. 28,432
Reissued May 27, 1975

28,432

CLASS "D" LINEAR AUDIO AMPLIFIER

James A. Ross, La Jolla, Calif., assignor to Rohr Industries, Inc., Chula Vista, Calif.

Original No. 3,579,132, dated May 18, 1971, Ser. No. 876,771, Nov. 14, 1969. Application for reissue Feb. 28, 1973, Ser. No. 336,853

Int. Cl. H03f *3/38*

U.S. Cl. 330—207 A 27 Claims

Matter enclosed in heavy brackets [ ] appears in the original patent but forms no part of this reissue specification; matter printed in italics indicates the additions made by reissue.

ABSTRACT OF THE DISCLOSURE

An audio frequency amplifier, useful to DC in which a pulse-width modulated signal is formed from the audio frequency signal. Each excursion of the pulse-width signal is cut in half with respect to time by an appropriately timed square-wave and plural logic gates. The resulting waveforms are passed without distortion by pulse transformers. Plural rectifiers and low-pass filters re-form the pulse-width modulated signal. This signal is impressed upon switching power transistors. These give a greatly amplified power output, which is the same type of amplitude-varying waveform as the input audio signal, upon the current flowing through a small choke to the load. The load may have any phase angle without incurring distortion of the output waveform. Half-bridge, quarter-bridge, full-bridge, and plural phase embodiments are described.

BACKGROUND OF THE INVENTION

This invention relates to linear audio frequency power amplifiers wherein the incoming signal is converted to a pulse-width modulated signal, amplified, and then reconverted to a signal of varying amplitude.

Circuits of this type are to be found in the art; see applicant's U.S. Pat. No. 3,400,334, issued Sept. 3, 1968. The apparatus thereof produces a sawtooth waveform to accomplish chopping. Short pulses are passed through pulse transformers in the amplifying process. Certain floating (ungrounded) power supplies were required. Reactive loads caused serious distortion of the output waveform. Additional active elements (silicon-controlled rectifiers) were required to prevent destructive overload.

Other apparatus of this class has employed magnetic amplifiers to control silicon-controlled rectifiers, thyratrons as grid-controlled rectifiers, and a chopper power amplifier employing "on" and "off" controlled rectifiers.

Inverters, to provide lightweight apparatus for converting DC power to typically 400-cycle sine wave AC, may employ pulse-width modulation; but that art appears to require high voltage ratings on transistors and cannot approach 100 percent modulation in practice.

SUMMARY OF THE INVENTION

The input signal to be amplified and a triangular waveform are combined in a comparator to give a corresponding pulse-width signal of constant amplitude. Each such pulse is sliced in half as to time duration by a square wave applied to plural logic gates. Each series of half-duration pulses is applied to a separate pulse transformer. The maximum duty cycle of any transformer for 100 percent modulation of the initial pulse-width signal is thus only 50 percent, because only half-duration pulses pass through each of the transformers. Accordingly, low frequencies including DC, may be amplified with fidelity.

Provision is made for current flow to or from the load by employing diodes in addition to power transistors in the output circuit. This prevents distortion of the output waveform, regardless of a reactive phase-angle load.

All power supplies may be grounded at one terminal.

DESCRIPTION OF THE PREFERRED EMBODIMENTS

Figure 1:
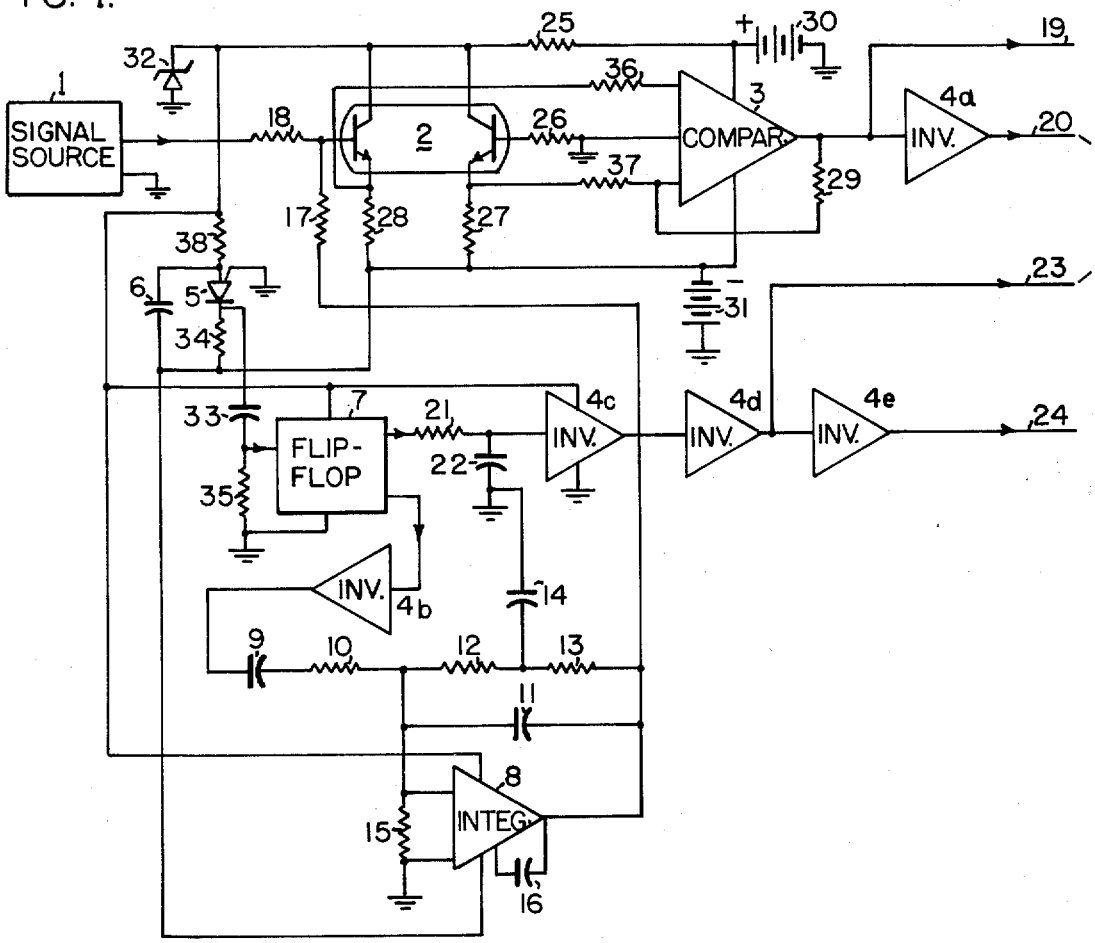
FIG. 1 is a schematic diagram of the input stages of the Class "D" linear audio amplifier according to this invention.

In FIG. 1, schematically illustrated element 1 is a signal source, such as a microphone, audio generator, function generator, or an equivalent source of amplitude-varying signals typically in the audio frequency range. In a practical embodiment this source may provide a voltage output of 1 volt.

A dual transistor 2 is employed to raise the impedance of the input circuit of the whole device to efficiently operate comparator amplifier 3. The right-hand base of what may be an RCA-type CA3018 dual transistor is tied to ground through resistor 26, typically of 5,000-ohms resistance. The left-hand base of element 2 is used as the summing point for the signal from signal source 1 and a triangular waveform. Resistor 18, 10,000 ohms, decouples the signal source from the summing point and resistor 17, of equal resistance, decouples the source of triangular waveform. The two emitters are connected to the differential inputs of comparator 3, individually through resistors 36 and 37, each of 47 ohms. The two emitters are further connected to battery 31 through resistors 27 and 28, each of 1,000 ohms. Feedback is provided for the comparator by resistor 29, of 10,000 ohms.

An energizing bias is provided for the emitters of transistor 2 and for comparator 3 by battery 31, of negative 6 volts, or by an equivalent power supply. Note that the positive terminal thereof is connected to ground in accordance with the feature of this invention which allows power supplies to be grounded at one terminal. Similarly, battery 30 provides positive 12 volts to further energize comparator 3 and transistor 2. Resistor 25, 100 ohms, and Zener diode 32, of 6-volts rating, are connected in series from the positive terminal of battery 30 to ground. Both collectors of dual transistor 2 are connected to the junction between the resistor and the diode to thereby be fed with a constant voltage.

Comparator 3 may be a Motorola MC 1710 CG integrated circuit operational amplifier of the differential-input single-ended output type. Its function is to transition its output from one state (positive) to another state (negative) whenever the input voltage to it transitions from negative to positive. The impedance of the source driving this type of comparator must be low. Dual transistor 2 provides this.

The feedback for the comparator through resistor 29 is from the output to the noninverting input. This provides positive feedback and a hysteresis effect. Thus, upon switching from one state to the other, the comparator acts like a Schmidt trigger and remains in the new state until the input is reduced a finite amount.

Element 4a is one section of a hexagon inverter integrated circuit in a typical embodiment. This may be a Motorola-type MC 789 P integrated circuit. It is used to provide an inverted output from comparator 3, as compared with its input. Other sections of the inverter integrated circuit are 4b, 4c, 4d and 4e, which are used elsewhere in the input stages of FIG. 1, as will be later described. A direct output passes from FIG. 1 to FIG. 2 from comparator 3 via conductor 19, while an inverted output similarly passes via conductor 20.

Unijunction transistor 5, a GE D13T1, is connected as an oscillator. The anode is connected to a 6-volts positive source of energizing power through resistor 38, of 10,000 ohms; while the cathode is connected to a 6-volts negative source through resistor 34, of 100 ohms. The anode gate terminal of the transistor is directly grounded. Capacitor 6, of 470 picofarads (pf.), is connected from the anode to signal ground, and causes the frequency of oscillation to be 100 kilohertz.

Flip-flop 7 is of the JK variety, and may be an integrated circuit-type MC 787 P. The 100 kHz. pulses from the cathode of transistor 5 are fed through capacitor 33, of 5,000 pf., and in shunt to resistor 35, of 100 ohms, to the input of flip-flop 7. The common terminal thereof is connected to ground and the power supply terminal is connected to plus 6 volts. The inverted output is fed to inverter 4b to amplify the signal to about a 4-volt peak-to-peak amplitude in order to properly feed integrator 8, an MC 1435 P integrated circuit.

Flip-flop 7 divides the frequency of oscillator 5 in half and provides an accurately symmetrical square wave at each of its outputs. The second output of the flip-flop is taken through resistor 21, 100 ohms, which, in conjunction with capacitor 22, of 800 pf., connected between the resistor and ground, provides a time delay for the square wave transitions. This output passes through amplifiers 4c and 4d to sharpen the transitions of the square wave from the rounding thereof brought about through the functioning of delay filter 21, 22. A typical delay obtained is of the order of 0.2 microsecond ($\mu$sec.) and is required to match the delay caused by integrator 8 and the positive feedback around high speed comparator 3. The positive feedback for hysteresis causes about 0.1 $\mu$sec. delay and the operation of integrator 8 causes another 0.1 $\mu$sec. delay; thus a delay of 0.2 $\mu$sec. is required. The delay output from the output of inverter 4d passes from the schematic diagram of FIG. 1 to FIG. 2 via conductor 23 and the inverted phase of the same is provided by inverter 4e. This is forwarded via conductor 24.

Integrator 8 includes subsidiary apparatus for accomplishing the integration function. The input arrives via capacitor 9, of 0.05 mfd., isolation and gain-reducing potentiometer resistor 10, of 6,800 ohms, in series with the capacitor and also in series with resistor 15, of 100 ohms, to ground. Resistor 10 connects to the inverting input of the MC 1435 P integrated circuit and resistor 15 is shunted across both inputs. Also connected to resistor 10 and the inverting input is a low-pass filter comprised of series-connected resistors 12 and 13, both of 5,000 ohms resistance, with capacitor 14, of 0.2 mfd., connected to the junction between the two resistors and ground. This filter is also connected to the output of integrator 8 and reduces the DC offset of integrator 8.

Similarly connected between the inverting input and the output of the integrator is feedback capacitor 11, of 1,500 pf. capacitance. This gives negative capacitive feedback to accomplish the integration. Capacitor 16, of 5,000 pf., is connected between the stabilizing terminals, to control the AC rolloff frequency.

Shunt resistor 15 controls the DC gain. The proper selection of values for elements 15 and 16, as given, results in the production of a linear triangular wave, devoid of both overshoots and rounding at the transitions.

Power is supplied to integrator 8 by a connection from the upper power supply terminal thereon to the positive 6-volt supply provided by Zener diode 32, and by a connection from the lower power supply terminal thereon to the negative 6-volt supply 31.

The output of the integrator, an accurate triangular waveshape, proceeds from the output terminal thereof through isolating resistor 17, of 10,000 ohms, to the first base of dual transistor 2, for mixing with the input signal from source 1 for processing by comparator 3.

Figure 2:
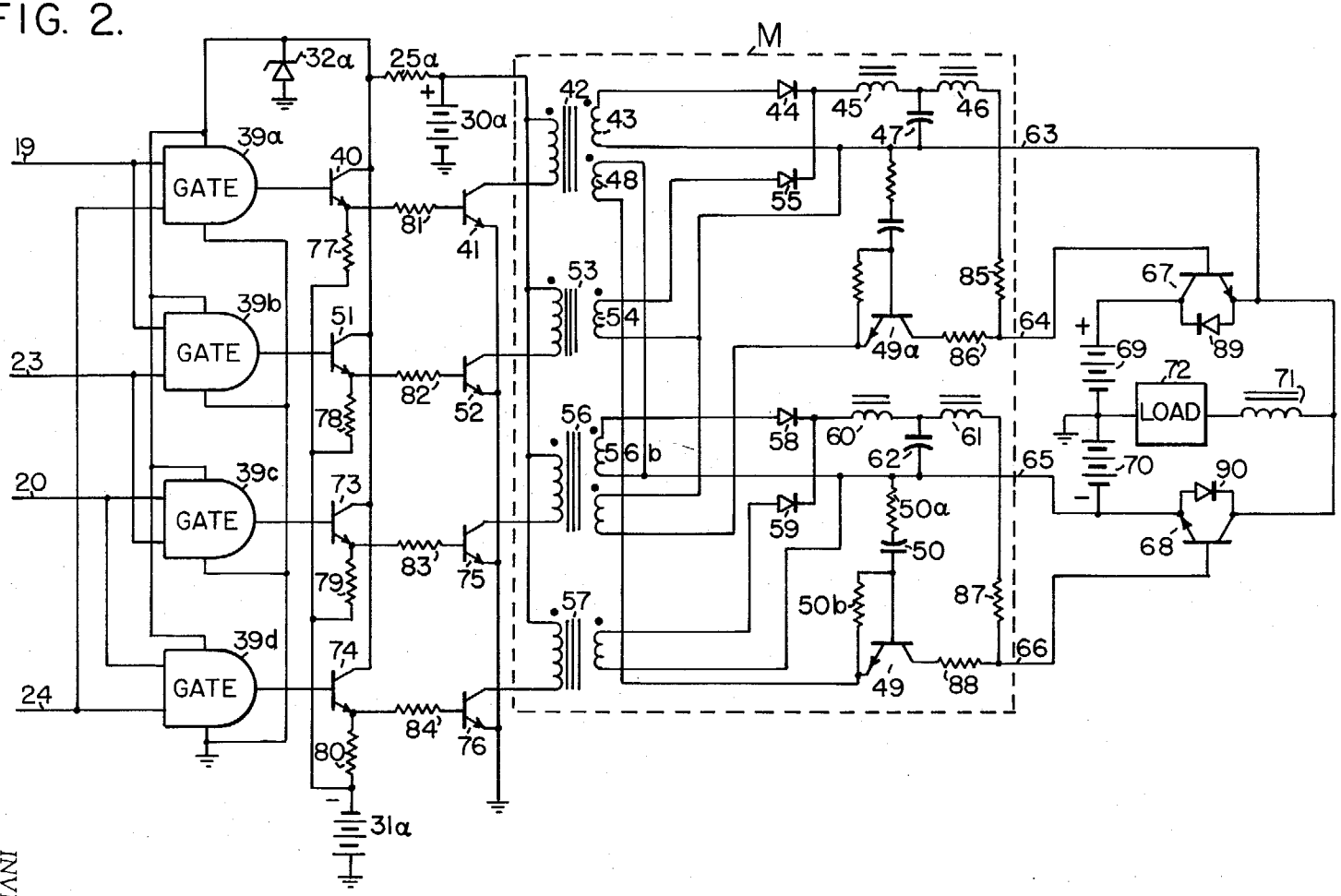
FIG. 2 is a schematic diagram of a half-bridge embodiment of the gating, transformer and power stages of the amplifier.

We now turn to FIG. 2 to consider a typical apparatus and mode of operation to utilize the functioning of the apparatus of FIG. 1. The two phase-opposed square waves from amplifiers 4d and 4e, which appear on output conductors 23 and 24, respectively, are used in FIG. 2 to control gates which split the outputs on conductors 19 and 20 exactly in half. This results in a maximum duty cycle of 50 percent; i.e., an alternating current in which the "on" interval is equal to the "off" interval. Such a current is easily and faithfully transformed by realizable transformers. It is then recombined to provide 100 percent modulation; i.e., DC, if required. High efficiency results in this type of what may be termed a Class D amplifier. Considering the amplifier as a whole, the isolation of the output from the input afforded by transformer coupling is considered a useful characteristic in many applications.

The inputs to FIG. 2 from FIG. 1 pass to a plurality of gates, 39a, b, c, d; which are separated into a first series, 39a & c, and a second series, 39b & d, to distinguish the related apparatus with which each series is associated. Each gale is typically a NAND gate having two inputs, in total, such as the Motorola MC 717 P, a quad two-input gate.

Conductor 19 is connected to the first inputs of gates 39a & b. Conductor 20 is connected to the first inputs of gates 39c & d. Conductor 23 is connected to the second inputs of gates 39b & c. Conductor 24 is connected to the second inputs of gates 39a & d.

The pulse-time modulated pulse carrying the signal to be amplified is present on conductor 19, while the square wave which has a transition exactly half way between the start and the finish of the pulse on conductor 19 is present on conductor 23. The first half of the pulse on conductor 19 passes through gate 39a, and the second half of that pulse passes through gate 39b.

The output of gate 39a is connected to the base of emitter-follower transistor 40, a Motorola MPS 6514. Resistor 77, 100 ohms, is connected to the emitter and also to the negative terminal of battery 31a, or equivalent, which provides an operating voltage of 6 volts. Battery 31a may be combined with battery 31 of FIG. 1, in practice. Analogously, the collector of transistor 40 is connected to Zener diode 32a, which maintains a positive 6-volt supply from resistor 25a and 12-volt battery 30a.

The emitter of transistor 40 is connected to the base of transistor 41 through resistor 81, of 100 ohms. Transistor 40 provides a slight negative bias to the base of transistor 41 when gate 39a is "off" and a positive bias to the same when gate 39a is "on."

Transistor 41 may be an RCA 2N5262 and is connected to the primary winding of pulse transformer 42, having typically a 2 to 1 stepdown ratio. The second terminal of the primary is connected to the positive terminal of battery 30a for energizing the transistor, the emitter of which is connected directly to ground. Transformer 42 is of the first type, characterized by having plural secondaries; in this case, two. Secondary 43 feeds current of positive polarity into diode 44, this diode being composed of four GE-type DA 1704 diodes in parallel, and also into filter network 45, 46 & 47. Inductor 45 may have an inductance of 0.02 microhenries ($\mu$h.) and inductor 46 of 0.007 $\mu$h., while capacitor 47 has a capacitance of 0.05 mfd. These elements comprise a low-pass filter having a cutoff frequency above the frequency of the pulse-width modulated signals.

Secondary 48 of transformer 42 provides a negative voltage of the order of 6 volts to the emitter of transistor 49, an RCA 2N5262. The base of this transistor is connected to capacitor 50, of 3,000 pf. capacitance, the other terminal of which is connected through resistor 50a, of 100 ohms, to the lower terminal of transformer 56 secondary 56b. Transistor 49 also has a resistor 50b, of 100 ohms, connected between emitter and base; the emitter also being connected to the lower terminal of secondary 48. Transistor 49 passes current for a period of time until capacitor 50 charges to a level of 5 volts. This results in current flowing out through connection 66 for a period of approximately 0.3 =sec. This reverse current from the base of transistor 68 aids in turning off this transistor before current can flow through secondary 43, through rectifier 44 and filter 45, 46 & 47 to turn on transistor 67.

The second half of the waveform pulse on conductor 19 passes through gate 39b, transistors 51 and 52, transformer 53, and from secondary 54 thereof through diode 55, which diode is the same type of component as diode 44. The several connections are the same as just previously described. Transformer 53 is different from transformer 42, in that transformer 53 is of the second type having only one secondary. However, the performance of the two secondaries 43 and 54 is the same, the additional secondary 48 on transformer 42 does not affect the performance of its secondary 43.

The cathodes of diodes 44 and 55 are connected together and to filter 45, 46 & 47. This results in the front half and the rear half of the pulse originally on conductor 19 being combined in time sequence. Thus, the original pulse of full duration is restored. Passing through resistor 85, having a small fraction of an ohm resistance, the pulse passes on through the apparatus on conductor 64.

In a similar manner, the waveform on conductor 20, which is an inversion of the waveform on conductor 19, passes through gates 39c & d. It is also split in half as a matter of time duration. This is accomplished by the square waveforms present on conductors 23 and 24, which enter gates 39c and 39d, respectively. Transistors 73 and 75, resistor 83, and transformer 56 are the equivalent of previously described elements 40, 41, 81 and 42, respectively, as are transistors 74 and 76, resistor 84, and transformer 57 the equivalents of elements 51, 52, 82 and 53, respectively. The corresponding connections are also the same. Diodes 58 and 59 are the equivalents of diodes 44 and 55, respectively, and filter 60, 61 & 62 is the equivalent of filter 45, 46 & 47.

In summation, each of transistors 40, 51, 73 & 74 are connected to sources of actuating power in the same way and to input and output circuits in an equivalent way. Transistors 41, 52, 75 & 76 are also connected to a source of actuating power and to ground in the same way and to input and output circuits in an equivalent way. The same polarity (direction of winding) of the several primaries and secondaries of transformers 42, 53, 56 & 57 is indicated by the dots at the ends of the windings.

Further, a companion transistor 49a complements transistor 49, as do the components associated with each. The relative symmetry of essentially all of the electronic circuit of FIG. 2 will be noted.

The remainder of FIG. 2 has to do with the power output circuit. The power transistors are 67 and 68. These may be single, relatively high power transistors for each of these opposed active elements, or they may each be a plurality of essentially normal output power transistors in parallel. In a practical embodiment this has reached a total of 56 RCA 2N5262 transistors for each of entities 67 and 68. With such an arrangement a corresponding number of 56 resistors 85 and 86 feed transistors comprising the generic transistor 67, and similarly for resistors 87 and 88 for generic transistor 68. Each individual transistor has two resistors individually connected to its base. A typical resistance for each individual resistor is 100 ohms.

The base of power transistor 67 is connected to conductor 64 for suitable actuation by the circuits previously described. The input circuit to transistor 67 is completed through conductor 63, which connects to the emitter of the transistor. In the same manner the base of power transistor 68 is connected to conductor 66 and the emitter to conductor 65.

The output circuit of these transistors includes battery 69, or equivalent DC power supply, such as a rectifier-filter or a fuel cell, which has a voltage of the order of 20 volts. The negative terminal thereof is grounded and the positive terminal is connected directly to the collector of transistor 67. The output circuit also includes a companion battery, or equivalent, with the positive terminal grounded and the negative terminal connected directly to the emitter of transistor 68.

The emitter of transistor 67 and the collector of transistor 68 are connected together and to one terminal of reactor 71, typically having an inductance of 50 $\mu$h. The other terminal of the reactor is connected to load 72 and the second terminal of the load is connected to ground. A fast recovery diode 89, such as a GE DA 1702, is connected between emitter and collector of power transistor 67, and individually if this be composed of a plurality of transistors. The cathode of the diode is connected to the collector of the transistor. The diode specified is particularly suited for a large plurality of paralleled power transistors comprising transistor 67, one diode across each. If only a single high power transistor is employed, the diode must have a greater current-carrying capability, of which the GE 1N3909 is an example. A corresponding relation exists between diode and transistor 68. Reactor 71 typically has an iron core.

The foregoing completes the structure of the input stages of FIG. 1 as connected to the half-bridge embodiment of the power stages of FIG. 2. Significant aspects of the functioning of these circuits follows. These aspects go to the method of operation of the amplifier and to certain unobvious circuit requirements.

Figure 3:
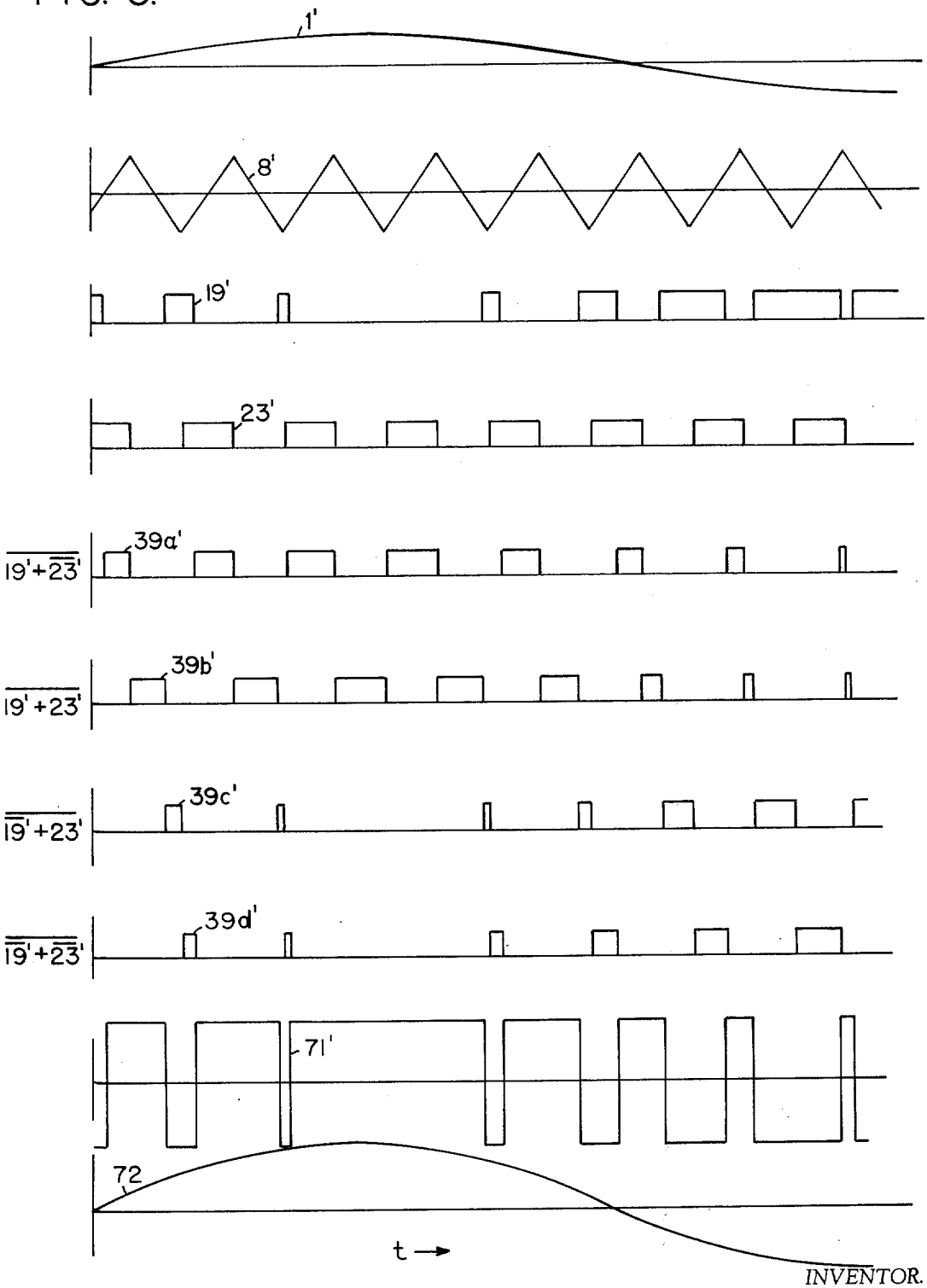
FIG. 3 shows time-related electrical waveforms that are present at various points in the apparatus.

FIG. 3 is employed in tracing the operation of the circuits. Waveform 1' represents a typical input waveform, having time as the abscissa and variation of amplitude as the ordinate. With the time scale chosen substantially three-fourths of one cycle of a sinusoidal waveshape having a frequency of the order of 4,000 hertz is shown. Substantially any waveshape can be handled by the apparatus, and at different frequencies, particular lower, than the frequency specified. The upper frequency limit of the apparatus is set by the inductance value of reactor 71. This value is determined by the ripple current considered allowable in any application of the amplifier, and by the oscillator frequency, this being 100,000 hertz in the examples that have been given. Also, the upper frequency limit may be raised by employing transistors having faster switching characteristics. In an amplifier at the present time the higher cost of such transistors may bar their use in commercial apparatus, but the future is expected to raise both the technical and the economic limits that might be a bar to increasing the upper frequency limit of the amplifier.

Waveform 8' is the triangular waveform appearing at the output of integrator 8, having a frequency of the order of 50 kilohertz (kHz.). Waveform 19' is the output from comparator 3, at conductor 19 in FIG. 1, and results from the summing of waveforms 1' and 8'. Waveform 19' is actually the inverse, phase shifted 180°, of the combination of waveforms 1' and 3'. This is due to the phase inversion of the comparator operational amplifier. In the general case, the conversion from amplitude to pulse-width variations results in pulses of long duration with short intervals between them for representing positive peaks of the amplitude variation, pulses of duration equal to the intervals between them for zero amplitude, and pulses of short duration with long intervals between them for negative peaks of amplitude variation. Waveform 19' is merely the inverse of this.

As a special case, the absence of any pulse in waveform 19' at the positive peak in waveform 1' occurs because its amplitude in a positive direction is greater than the amplitude of waveform 8' in a negative direction. This condition may just be permitted at peaks of the 1' waveform, with fidelity still being retained.

Waveform 23', at conductor 23 of FIG. 1, is essentially the output of square wave producing flip-flop 7 after a delay is introduced as required and the waveform has been sharpened to have needed rectangularity by inverters 4c and 4d. This waveform is precisely timed to split each pulse waveform 19' in half according to the process of this invention. This relation will be seen by vertically comparing waveforms 19' and 23', any corresponding point representing the same instant of time for both waveforms. Note that the halving occurs whether the pulse width of waveform 19' is large or small.

Waveform 39a' is the output of NAND gate 39a. This represents NOT (19' and NOT 23'), as shown by the logic term at the left of the waveform in FIG. 3. Waveform 39b' is similarly the output of NAND gate 39b, and this is NOT (19' and 23'). Waveform 39c' is the output of gate 39c, and this is NOT (NOT 19' and 23'). Finally, waveform 39d' is the output of gate 39d and is NOT (NOT 19' and NOT 13').

The power output circuit of FIG. 2 has opposed active elements, transistors 67 and 68. Since these transistors operate in the switching mode, they alternately connect positive power supply 69 or negative power supply 70 through reactor 71 to load 72. This switching is accomplished with the base drive signals supplied by conductors 64 and 66.

Waveform 71', FIG. 3, is the voltage present at reactor 71 and waveform 72' is the smoothed voltage at load 72. The filtering effect of the reactor reproduces the original amplitude-varying waveform, though at a greatly increased power level, as desired.

Further considering the circuits of FIGS. 1 and 2, dual transistor 2 is employed to reduce the effect of temperature drift. It is not connected as a differential amplifier, but as two emitter-followers. Both sections of the transistor are on the same chip of semiconductor material and in the same metal can. The base of the right-hand transistor section is tied to ground through resistor 26. The emitter of that section serves merely as a reference for one input of comparator 3.

Silicon transistors have been recited as typical herein, but those of Germanium, Gallium Arsenide, etc. could be used, including those of the field-effect type. The requirements are rapid switching (in the nanosecond range), adequate current-carrying capacity, capability of turning off current without punch-through, low forward voltage drop when conducting, and low leakage current when not conducting.

If power output transistors are to be paralleled to comprise elements 67 and 68 and obtain a power output of the order of 500 to 1,000 watts, then the Beta of each must meet an average value. A spread of as much as 3 to 1 in value is satisfactory. Herein, the base current of each is limited by base resistors 85 or 87, and individual resistors are provided for each of the paralleled transistors. A limiting value of 35 milliamperes (ma.) for each of the RCA 2N5262 transistors specified is typical. With this base current no transistor will carry more than 3 amperes. Since the transistors are either "on" or "off," this is still within the dissipation rating and the rating to run off this current at rated voltage without punch-through or secondary breakdown. The nominal current is 1 ampere per transistor.

Diodes 44 and 55, FIG. 2, are preferably of the fast type. When the quarter cycle of current carried by diode 44 ceases and diode 55 starts passing current, the former must surely be "off," otherwise the latter will feed unwanted current in the reverse direction through the former. This results in a large "glitch," a steep return to the axis of the waveform, in the waveform supplied to the bases of the power transistors 67 and 68, and an unwanted distortion in the output of the amplifier with increased dissipation in the power transistors. Each of diodes 44 and 55 carry 35 ma. per power transistor, and for this base current rating typically a considerable number of power transistors are paralleled. Small glass high-speed computer-type diodes are satisfactory.

Diodes 89 and 90 carry current when power transistors 67 and 78 are "off." These are also preferably of the fast type as before, but of higher voltage rating. It is important that these transistors turn "on" and "off" rapidly and that the diodes do the same. This can be accomplished with minimum inductance of all conductors connecting these elements, including those within the diodes. For example, when power transistor 67 is turned "off" the load current through inductor 71 will continue to flow. It will have to flow through turned "off" transistor 67 or through diode 89. The more rapidly diode 89 can be turned "on" the sooner wasteful dissipation caused by forcing current through an "off" transistor is terminated. The time to have the diode take over carrying current should be 50 nanoseconds (ns.) or less for desired efficiency and performance. Such diodes are commercially available and the external wiring is kept short and otherwise of low inductance. Where paralleled power transistors are employed, one diode is used for each power transistor.

Although the functioning of reactor 71 is significant in the operation of the amplifier of this invention, its effect is at frequencies very much above the audio frequencies typically amplified. With the typical value of inductance of 50 $\mu$h. its reactance at 3,000 Hz. is only 1 ohm; thus it has negligible inductive reactance at the upper audio frequencies normally amplified. It is at the commutating frequency of 50,000 Hz. and at "spike" harmonics thereof, which are many times higher in frequency, that the reactor exerts significant inductive effect.

It is during the transition period between "on" and "off" and vice versa for the power transistors that the dissipation in the amplifier is its highest. To minimize this period capacitor 50, which is connected to the base of transistor 49, charges rapidly when transistor 41 is turned "on." This momentarily and quickly turns "on" transistor 49, which in turn acts to turn "off" power transistor 68 by reversing the base current thereof. A corresponding effect takes place on the other side of the amplifier involving transistor 49a and transistor 67.

In an embodiment a power efficiency of 93.5 percent was accomplished in the amplifier proper. Additional losses occurred in the power supply, so that the overall efficiency was 90 percent. This is high; however, as compared with an efficiency of 40 percent for a Class A amplifier and of 60 percent for a Class B amplifier, such as are normally employed for audio frequency amplification.

With respect to integrator 8, the square wave from flip-flop 7 is not equally above and below the zero volt DC axis. It is desirable that the triangular waveshape 8' in FIG. 3 be centered on the zero axis. Accordingly, blocking capacitor 9 is employed. Resistors 12 and 13 provide feedback for the integrator, with the alternating current component of the signal bypassed to ground through capacitor 14. This leaves an active AC amplifier arrangement, with capacitor 11 the feedback integrating capacitor, and the mean value of the output at the zero axis.

Resistor 15 is of low value, 100 ohms, and with resistor 10 forms a voltage divider of large ratio since the value of resistor 10 is typically 6,800 ohms. The value of resistor 15 determines the fine structure of the triangular waveshape. If it is too small the peaks of the waveshape are rounded. If it is too large, overshoot spikes result. However, once the proper value has been chosen for the circuit, other integrated circuit elements can be substituted for integrator 8, as for circuit repair, and the triangular waveshape remains proper.

While NAND gates have been shown in the embodiment described, it is also possible to use OR, NOR or AND gates instead. Appropriate change in the logic is made.

Gates 39a, b, c, d shown are of nominal power output. Associated transistors, such as 40 and 41 for gate 39a, are employed to increase the power level of the signals involved for driving the transformers, as transformer 42. With gates of higher power now obtainable, each of the transistors exemplified by transistor 40 may be omitted. With still higher power gates, both transistors 40 and 41 may be omitted.

The output voltage is made to be a faithful, but amplified, copy of the input voltage regardless of the phase-angle of the load in this amplifier by arranging the output circuit so that the output voltage is independent of the output current.

If current is flowing outward from the emitter of power transistor 67 while that transistor is turned "on"; i.e., is saturated, the output lead including 63 is at the positive voltage of power supply 69, save for a very small voltage drop through the transistor. On the other hand, if current is flowing in the opposite direction at that moment; i.e., from load 72 back through reactor 71, transistor 67 is "on" and transistor 68 is "off," as before, and this current cannot flow through transistor 67, since any transistor can conduct in only one direction. Thus, this current flows through diode 89, which is shunted across transistor 67. Again, the voltage at the output terminal is at the positive voltage of power supply 69, save for a small voltage drop through the diode. An equivalent situation obtains for negative power supply 70, transistor 68, and diode 90.

In this way the output voltage at the load is independent of the phase-angle through the load, thus it is independent of the power factor of the load. This property sets the present invention apart from the prior invention of Ross in U.S. Pat. No. 3,400,334, as was mentioned at the beginning of this specification.

Figure 4:
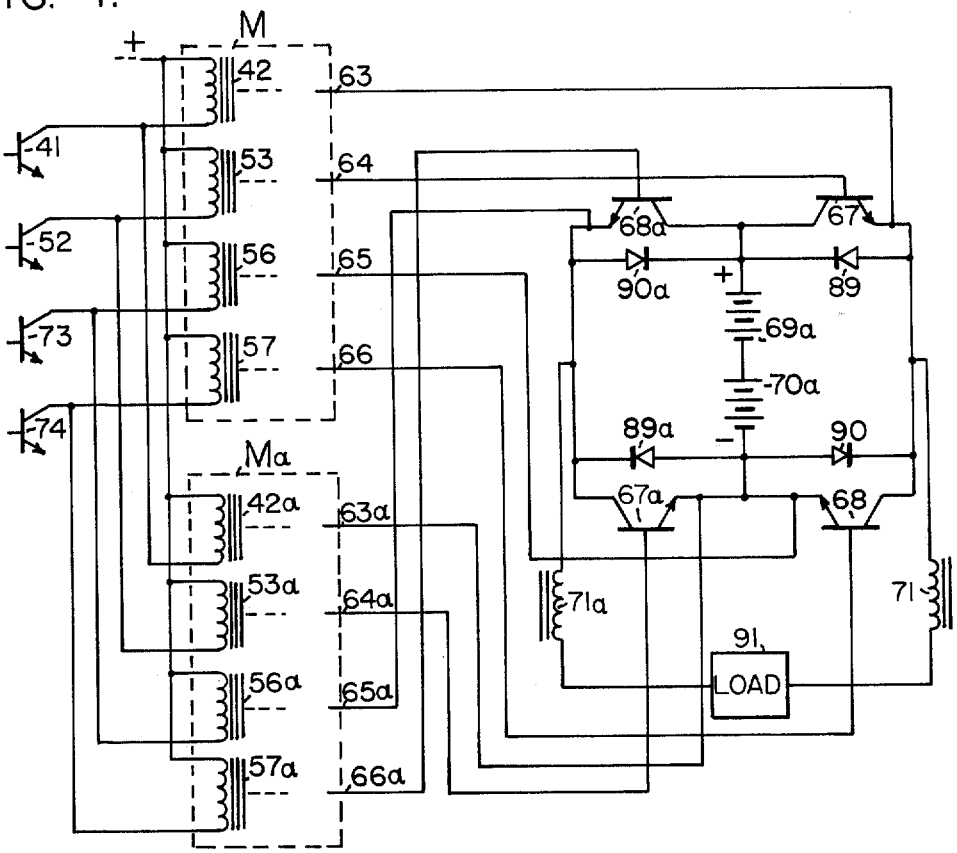
FIG. 4 is a schematic diagram of a full-bridge embodiment of the invention, showing the transformer connections and the power amplifier.

FIG. 4 shows the alteration of FIG. 2 required to modify the apparatus thereof of a half-bridge embodiment to a full-bridge embodiment. The input stages of FIG. 1 are unaltered, as are gates 39a, etc., transistors 40, 41, etc., as well as all of the transformers, such as 42, the corresponding rectifiers 44, 55, 58 & 59, and the outputs at conductors 63, 64, 65, & 66.

The modification takes the form of an additional set of transformers and rectifiers, giving four more output conductors 63a, 64a, 65a & 66a. These connect to an additional pair of power transistors 67a & 68a, and feed an equivalent load 91 through an additional reactor 71a.

In FIG. 2 the transformers, rectifiers, filters and associated elements are contained within a dotted rectangle M. This group of apparatus is identified as a "modulator." In FIG. 4 this same modulator M is implied by the upper rectangle M, with the incoming and outgoing conductors shown. A duplicate modulator Ma is shown below modulator M, with the input connections to the transformers being in parallel to the corresponding input connections of upper modulator M. Similarly, the output conductors are the same and are identified with the subscript a.

In the power part of the circuit of FIG. 4, the power transistors, diodes across the same, and the reactor according to the correspondingly numbered elements of FIG. 2 will be found at the right side of the illustration. At the left side the corresponding but additional elements are found, having subscripts a. Power supplies 69a and 70a are the same as power supplies 69 and 70 in FIG. 2; however, a center-tap connection from the junction between the two is not required to be connected elsewhere in the circuit. Accordingly, one power supply of twice the voltage of either of the former power supplies could be employed in FIG. 4.

The impedance, normally resistive, of load 91 in FIG. 4 is twice the magnitude of that of load 72 in FIG. 2. The output power available is thus also twice that of the half-bridge embodiment of FIG. 2, as is the voltage across the load as well.

Figure 5:
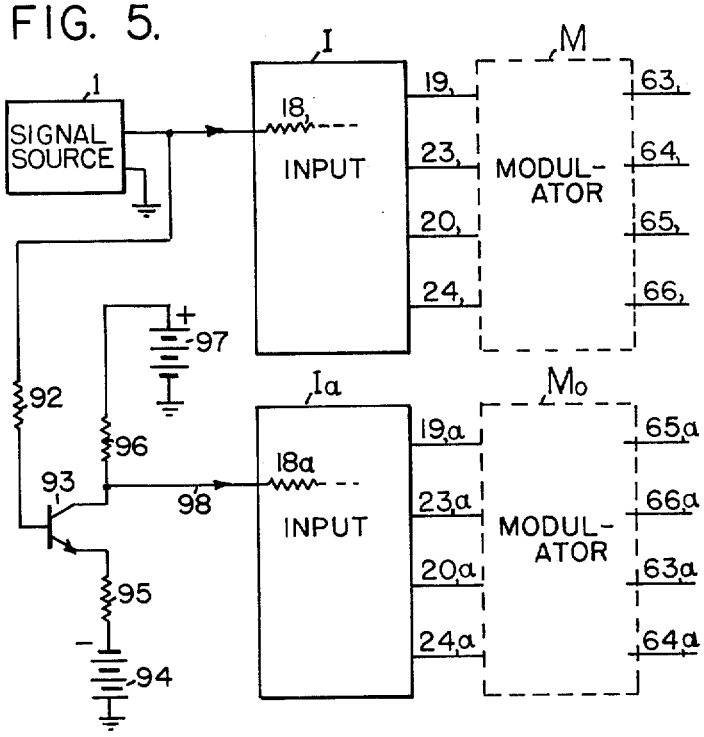
FIG. 5 shows an inverted phase embodiment of the full-bridge.

FIG. 5 shows an alternate embodiment in connecting the drive apparatus to the bases of the power transistors in the full-bridge arrangement. This employs two modulators, M and Ma, as before, but these are separately driven out of phase rather than in phase as in FIG. 4. Likewise, the input stages according to FIG. 1 are also duplicated. One of these is fed out of phase in FIG. 5. They are identified as I and Ia, respectively.

Signal source in FIG. 5 is the same as signal source 1 in FIG. 1; being a microphone, audio generator, etc. The output thereof feeds directly into input stages I, as before. However, this output also passes through resistor 92, of 10,000 ohms, to the base of a phase-inverting transistor 93, an NPN-type 2N3958A. The emitter thereof is given a negative bias by battery 94, or equivalent, through resistor 95, of 5,000 ohms. The collector is connected to load resistor 96, of 5,000 ohms, and is given a positive bias by battery 97. Conductor 98 conveys the thus phase-reversed signal to the input of a duplicate of the input apparatus of FIG. 1; i.e., to a resistor 18a, which is the equivalent of resistor 18 in FIG. 1.

The outputs from input stages I pass into modulator M through conductors 19, 20, 23 & 24, as aslo shown in FIG. 1 in detail. Similarly, the otuts from input stages 1a pass into modulator Ma through conductors 19a, 20a, 23a & 24a. Following the pattern that should now be apparent, output conductors 63, 64, 65 & 66 from modulator M connect to emitter and base of transistor 67 and to emitter and base of transistor 68, respectively. This is according to FIG. 4, and this portion of the whole circuit has not been redrawn in FIG. 5.

The output conductors from modulator Ma are inverted in order with respect to those of modulator M because phase inverter 93 is present in front of modulator Ma. That is, conductors 65a & 66a connect to base and emitter of transistor 67a in FIG. 4, and conductors 63 and 64a connect to emitter and base of transistor 68a, respectively.

The advantage of the circuit of FIG. 5 over that of FIG. 4 is that the ripple voltage appearing at the output load terminals of the bridge is considerably reduced in ampliture and the ripple frequency is doubled. For the same ripple in the load the inductance of reactors 71 and 71a may be reduced by a factor of four. This provides a more rapidly responding amplifier in return for the complication of two separate and complete sets of initial circuits and modulators.

Figure 6:
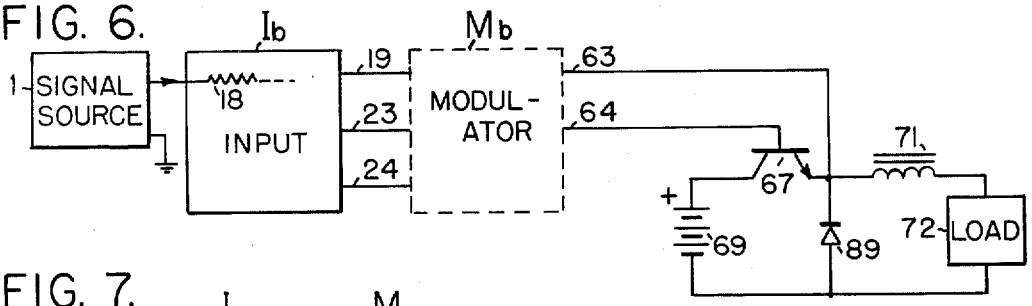
FIG. 6 is the schematic diagram of a quarter-bridge embodiment.

FIG. 6 illustrates a quarter-bridge embodiment. This is a simplification over the half-bridge embodiment detailed in FIG. 2. Only half of all the apparatus shown in that figure is employed. Likewise, per in FIG. 1, only three outputs, conductors 19, 23 & 24, are used in the simplified version Ib of the input stages. These three inputs enter simplified modulator Mb, which has only two gates 39a and 39b, two transformers 42 and 53, one filter 45, 46 & 47, and two output conductors 63 and 64.

As shown in FIG. 6, these conductors connect to emitter and base, respectively, of single transistor 67. Reactor 71 is connected to the emitter and to load 72, while the second terminal of the load is connected to the negative terminal of battery 69. The cathode of diode 89 is connected to the emitter of transistor 67, while the anode is connected to the second terminal of the load. In this simplified embodiment the current does not reverse in the load, thus the different connection of the diode.

In the embodiment of FIG. 6 modulator Mb receives an input signal in only one polarity and the signal output varies from zero in the positive direction only. This embodiment is suited for supplying power to a DC motor in which reversing polarity is not required.

Figure 7:
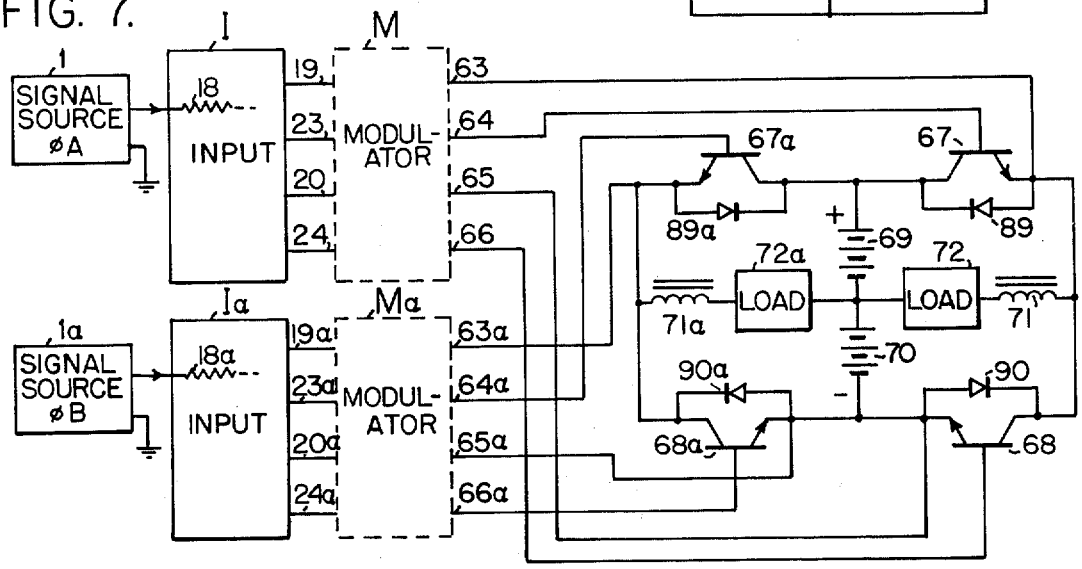
FIG. 7 is the schematic diagram of a two-phase half-bridge embodiment.

FIG. 7 illustrates a two-phase half-bridge embodiment. This roughly follows the full-bridge embodiment of FIG. 4, but there are differences, as will become apparent.

Typically, two singal sources are employed, having at any instant of time the same frequency but different phase, say 90° different. The two sources might be connected in some manner to retain the same frequency and difference of phase, but these are not requirements for the functioning of this embodiment.

Thus, source 1 having a phase timing of A is connected to input stages I, from which emerge four outputs, 19, 23, 20, & 24. These enter modulator M, and therefrom emerge outputs 63, 64, 65 & 66. Conductor 63 connects to the emitter of transistor 67 and conductor 64 to the base thereof. Conductor 65 connects to the emitter of transistor 68 and conductor 66 to the base thereof. However, note that transistors 67a & 68a occupy reversed positions from those occupied in FIG. 4. This change occurs because in a full-bridge circuit opposite corners switch together. In a two-phase embodiment opposite corners switch from different modulators 90° apart in time. Notwithstanding, conductor 63a connects to the emitter of transistor 67a and conductor 64a to the base thereof, while conductor 65a connects to the emitter of transistor 68a and conductor 66a to the base thereof.

Because of the two-phase nature of the apparatus of FIG. 7, two loads 72 and 72a are to be found at the output. These are symmetrically connected, with one terminal of each connected to the common, signal ground, point between the two power supplies, the positive one 69 and the negative one 70. The second terminal of load 72 is connected to reactor 71, while the second terminal of load 72a is connected to reactor 71a. These reactors typically have an inductance value of 50 $\mu$h each. Diodes 89, 90, 89a & 90a reverse bias each of the four power transistors in the same manner and for the same reason as in FIG. 4.

The second phase signal originates in source 1a at a phase B, and enters input stages 1a which has outputs 19a, 23a, 20a, & 24a, similar in nature to the corresponding apparatus for phase A. Modulator Ma accepts the above outputs and has outputs 63a, 64a, 65a & 66a, which connect to the power output stages as has been described.

Figure 8:
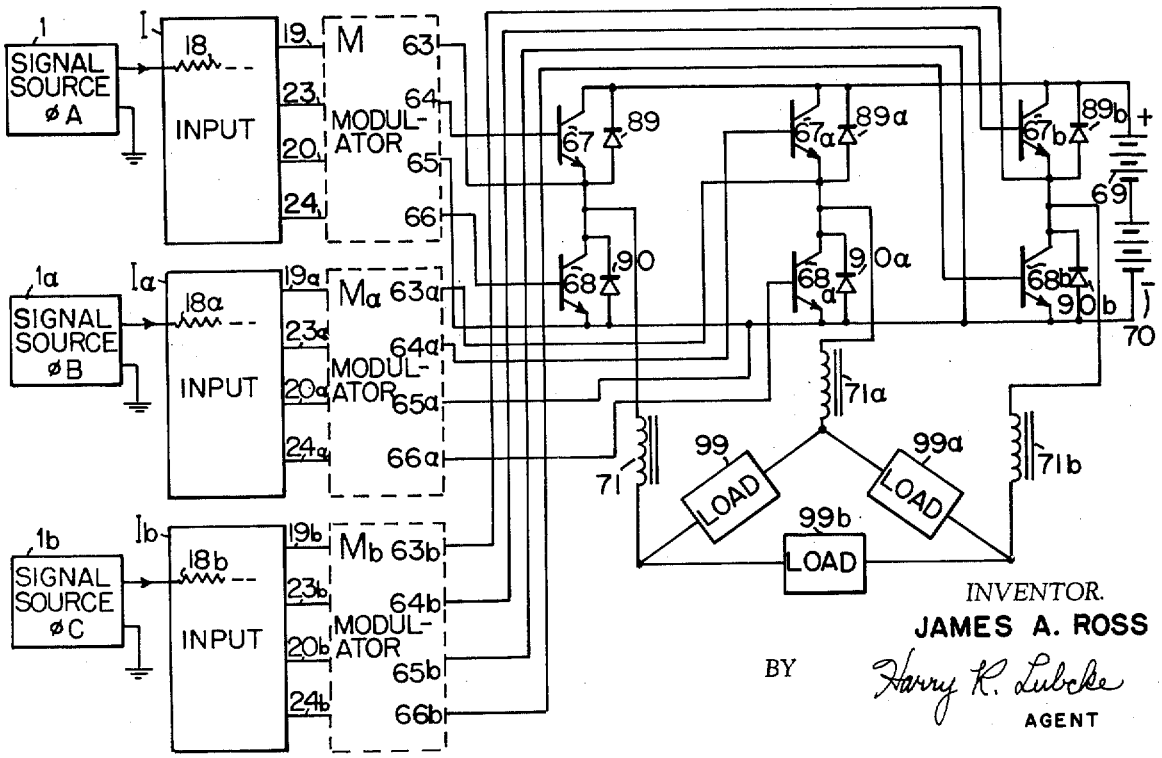
FIG. 8 is the schematic diagram of a three-phase half-bridge embodiment.

FIG. 8 illustrates a three-phase half-bridge embodiment. It is suited to operate from a three-phase input signal and deliver power to a three-phase load.

The structure of FIG. 7 is followed by extending it to one more phase, with a typical phase relation of 120°, but not necessarily so. Three signal sources 1, 1a & 1b are of the same frequency but of different phases, and these originate the signal inputs to be amplified. For identification the phases of the sources are, A, B & C. Each source is connected to a corresponding input stages entity I, Ia & Ib, each of which has outputs corresponding to those on conductors 19, 23, 20 and 24. These outputs enter modulators M, Ma & Mb, each of which has outputs corresponding to those on conductors 63, 64, 65 & 66. Each of these connect to a pair of power transistors corresponding to transistors 67 & 68 in the manner that has been repeatedly recited. Three pairs of power transistors are provided, one pair for each phase, and having differentiating subscripts. Each power transistor is shunted by a diode as before. The three-phase load has separate phases 99, 99a & 99b, and is shown delta connected.

A connection from the common connection between the emitter of transistor 67 and the collector of transistor 68 passes through reactor 71 and to the connection between loads 99 and 99b. A similar connection from between transistors 67a and 68a passes through reactor 71a and to the connection between loads 99 and 99a. A further similar connection from between transistors 67b and 68b passes through reactor 71b and to the connection between loads 99a and 99b. In this configuration each reactor has a typical value of 50 $\mu$h.

Power supplies 69 and 70 are connected in series without any external midconnection. The positive terminal of supply 69 connects to the collectors of transistors 67, 67a & 67b, while the negative terminal of supply 70 is connected to the emitters of transistors 68, 68a & 68b. Diodes 89, 89a & 89b are reverse bypass connected across transistors 67, 67a and 67b; while diodes 90, 90a & 90b are similarly connected across transistors 68, 68a & 68b.

A Y connected three-phase load may be energized by connecting it to the three reactors 71, 71a & 71b, instead of to the delta configuration shown. The extremities of the Y are connected to the reactors; the common center of the Y connects to the second terminal of each load. If the Y load is nonsymmetrical the common center (neutral) is connected to the interconnection between power supplies 69 and 70.

Typical load impedances for the several embodiments are as follows. For the single-phase half-bridge load 72; 0.4 ohm. A 1,000-watt peak output is obtained by 100 percent modulation with power supplies 69 and 70 of 20 volts each. For the single-phase full-bridge load 91 the load impedance is 0.8 ohm and the peak power is 2,000 watts under 100 percent modulation conditions. For the three-phase half-bridge load 99 the load impedance is 1.2 ohms with 1,000 watts peak output at 100 percent modulation.

While the type of load employed with the amplifier of this invention may take many forms and does not directly involve the invention, the provision of a high-efficiency high-power amplifier opens certain new applications.

Its use with a high power loudspeaker, or with a group of the same, including those for underwater sound, will be understood. Additionally, by varying an oscillator frequency as the input and employing an induction or a synchronous-type motor as the load, a dependable variable speed power drive is provided, as for a drill press, which may be programmed as to speed of rotation with time by programming the oscillator as to frequency as a function of time. The same control is possible for the known vibration exciter, or "shaker." Similarly, a tractive motor for railways or for other vehicles may be of the rugged induction or synchronous-type and still be controlled as to speed of rotation by suitably controlling the frequency of the input to the amplifier. It is in this type of service that the two- or three-phase embodiments would be expected to find application.

Since the main power sources for the amplifier are of the direct current type, fuel cells and similar contemporary devices may be used, as for isolated environments.

As to certain possible modifications, while the division exactly in half of all the pulse-width pulses is desirable, the invention is operative if this is other than exact; say, ⅜, ⅝ instead of ½, ½. The requirement is that long pulses be essentially halved. This is accomplished with the ⅜, ⅝ division. Although a short pulse might not be divided and go only through one transformer, as 42, with no pulse at all through the companion transformer, as 53, the output would be proper. Accordingly, the term "half" as used throughout this specification and claims is also to be interpreted as "approximately half."

Also, while base filters, as 45, 46 and 47, are desirable, it is possible to employ a resistor in each of the two circuits that are summed at this part of the circuit as an equivalent.

I claim:

1. An electrical amplifier comprising;

a. comparator apparatus (1 to 24) having feedback to form a pulse-width modulated signal (19') from an amplitude-varying input signal (1') and a triangular wave amplitude-varying signal (8'), b. first and second series of gating means (39a & c; 39b & d) connected to said comparator means, each said series supplied with a square wave signal (23' or 20') time related to said triangular wave signal to alternately pass said pulse-width modulated signal in successive halves of the duration of each pulse width, c. a first type transformer (42, 56) having a primary and plural secondaries (43 & 48), said primary connected to one of said first series of said gating means (39a), d. a second type transformer (53, 57) having a primary and one secondary (as 54), the primary of said second type transformer connected to one of said second series of said gating means (39b), e. a plurality of low-pass filters (45, 46, 47; 60, 61, 62) equal in number to the number of said gating means in said first series, each said filter connected to secondaries of both a first and a second type transformer, f. a power amplifier having at least two active elements (67 & 68) in opposed groups, and an output, g. a connection (64) from one of said plurality of low-pass filters to one (67) of said active elements, h. a connection (66) from another of said plurality of low-pass filters to a said active element (68) that is in the group opposed to said one active element, i. a load (72), and j. a connection from the output of said power amplifier to said load.

2. An amplifier according to claim 1, in which said comparator apparatus is comprised of;

a. a source of triangular waveform (5, 8), b. a comparator (3) connected to said source of triangular waveform and receiving said amplitude-varying input signal (1')

to give an amplitude transition each time said triangular waveform becomes greater or less in amplitude that the amplitude of said input signal, c. plural inverters (42a, b, c, d, e) connected to said comparator to form comparator related outputs (23')

d. a flip-flop (7), and e. connections (19, 20, 23, 24) from said comparator, said inverters, and said flip-flop, to said first and second series of gating means (39a, b, c, d).

3. An amplifier according to claim 2, in which said source of triangular waveform is composed of;

a. a square wave generator (5, 7), and b. an integrator (8) connected to said square wave generator, and which additionally includes;

c. a connection from said square wave generator to said first (39a, c) and second (39b, d) series of gating means through plural said inverters.

4. An amplifier according to claim 3, in which;

a. each of said gating means (39a, b, c, d) is a NAND gate, having an input from plural said comparator-related outputs.

5. An amplifier according to claim 1, in which said transformers are;

a. stepdown in ratio from primary to secondary, and b. have nonconductive isolation between each primary and each secondary,

6. An amplifier according to claim 1, in which each of said low-pass filters includes;

a. a diode (44), and b. inductive (45, 46) and capacitive (47) filter elements, having a cutoff frequency above the frequency of said pulse-width modulated signal (19').

7. An amplifier according to claim 1, in which;

a. each of said opposed active elements (67, 68) is a switching-type transistor,

8. An amplifier according to claim 1, in which said connection (par. j) from the output of said power amplifier to said load (72) includes;

a. a reactor (71) having negligible inductive reactance at the highest frequency of said amplitude-varying input signal (1').

9. An amplifier according to claim 1, in which;

a. said first and said second series of gating means each have two gating means, b. there are two said first-type transformers, and c. there are two said second-type transformers.

10. An amplifier according to claim 1, in which there are;

a. four said first-type transformers, b. four said second-type transformers; and in addition, c. connections to parallel two of each said type transformers with two other of the corresponding said type.

11. An amplifier according to claim 1, which additionally includes;

a. a second set (Ia) of said first and second series of said gating means, b. an inverter (930) connected from the source of said input signal (1) to said second set of gating means, c. connections (19, 20, 23 24) from the first set of said gating means to four of said first- and second-type transformers, and d. connections (19a, 20a, 23a, 24a) from said second set of said gating means to four more of said first- and second-type transformers.

12. An amplifier according to claim 1, in which there are;

a. only said first series of said gating means, having two gating means, b. only one said first-type transformer (42), c. only one said second-type transformer (53), d. only one said low-pass filter, and e. only one said active element (67).

13. An amplifier according to claim 1, which additionally includes;

a. a second comparator apparatus (1a) to form a pulse-width modulated signal from a second amplitude-varying input signal, b. connections from said second comparator apparatus to at least two additional opposed active elements (67a, 68a), c. an additional load (72a), and d. connections from said additional opposed active elements to said additional load.

14. An amplifier according to claim 1, which additionally includes;

a. second and third comparator apparatus (1a, 1b) to form a pulse-width modulated signal from a second and a third amplitude-varying input signal, respectively, b. connections from said second and third comparator apparatus to at least two additional second (67a, 68a) and also third (67b, 68b) opposed active elements, respectively, c. additional second and third loads (99a, 99b), and d. connections from additional said second and third opposed active elements to said second and third loads, respectively.

*15. A linear AC-DC signal amplifier comprising:*

*(a) a plurality of signal gates controlled by a square wave control signal for converting the signal to be amplified from a first train of width-modulated pulses to a second and a third train of width-modulated pulses each pulse of said second train corresponding in width to the leading one half of each pulse of said first train and each pulse of said third train corresponding in width to the trailing one half of each pulse of said first train wherein the combined duty cycle of each successive pulse of said second and third train equals the duty cycle of the associated halved pulse of said first train said square wave control signal having a polarity transition exactly halfway between the leading and trailing edge of each pulse of said first train of width-modulated pulses;*

*(b) means separately responsive to said second and third pulse trains for combining and amplifying said successive pulse halves to form a train of combined pulses at increased amplitude level; and*

*(c) means for converting said train of amplified pulses to reform said signal at an increased amplitude level.*

*16. An amplifier as in claim 15 wherein the signal converter means comprises signal modulating means.*

*17. An amplifier as in claim 16 wherein said modulating means includes a triangular waveform input for adding to said signal to be amplified to form said first train of width-modulated pulses.*

*18. An amplifier as in claim 7 wherein said square wave input to said gates passes the first half of each of said width-modulated pulse and includes inverter means to separately pass the second half of each said width-modulated pulses.*

*19. An amplifier as in claim 15 wherein said combining and amplifying means includes a switching amplifier and a low pass filter input to the amplifier for removing frequency components above the frequency of the signal to be amplified.*

*20. An amplifier as in claim 19 wherein the input to said filter includes a pair of pulse transformers for respectively passing said second and third pulse trains and for isolating said signal converting means from said amplifying means.*

*21. An amplifier as in claim 15 wherein said amplified pulse train converter means includes a reactor connected in series between the amplifier and load.*

*22. An amplifier comprising:*

*means for forming a continuous train of pulse width-modulated signal from an electrical input signal;*

*means including a square wave signal said square wave signal having polarity transition exactly halfway between the leading and trailing edge of each pulse of said train of pulse width-modulated signal for bisecting each pulse of said pulse train and separately passing the bisected portions;*

*means for reassembling and amplifying said bisected portions to provide amplification of each said pulse; and*

*means for demodulating said amplified pulse to produce an output signal which is a faithful reproduction of said electrical input signal at greater amplitude.*

*23. An amplifier as in claim 22 wherein said forming means includes a source of a triangular waveform modulation signal having a greater frequency than said input signal.*

*24. An amplifier as in claim 22, wherein said passing means includes pulse transformers.*

*25. An amplifier as in claim 22, wherein said demodulating means includes a reactor.*

*26. Means for amplifying an amplitude-varying signal comprising:*

*(a) means for forming a pulse-width-varying signal from a combination of said amplitude-varying signal and a signal having a triangular wave shape;*

*(b) gating means including a square-wave input signal having polarity transitions exactly halfway between the leading and trailing edges of each pulse of said pulse-width-varying signal connected to the output of said pulse-width-varying signal forming means, to halve and separate each pulse of said pulse-width-varying signal with respect to time duration;*

*(c) exclusively alternating-current-conveying means connected to said gating means for respectively conveying successive halves of said pulse-width-varying signal;*

*(d) filter means for filtering the pulsed output of said conveying means;*

*(e) switching amplifying means for amplifying the pulsed output of said filter means; and*

*(f) means for reforming said amplitude-varying signal at increased amplitude from the pulsed output of said amplifying means.*

*27. An improved AC-DC amplifier comprising:*

*(a) means for forming a pulse-width modulated signal from the signal to be amplified modulated with a high frequency signal, said pulse-width modulated signal comprises a train of successive pulses having widths corresponding to instantaneous amplitudes of said signal to be amplified;*

*(b) first and second gating means controlled by a control signal synchronized with said high frequency modulation signal for alternately passing successive halves of each pulse of said train of pulses forming first and second trains of successive half pulses;*

*(c) drive means for separately passing said first and second trains of successive half pulses to an amplifier means, said emplifier means reassembles the corresponding halves of each pulse; and*

*(d) inductance means for converting the amplified and reassembled pulse-width modulated signal to an amplified reproduction of said incoming signal.*

References Cited

The following references, cited by the Examiner, are of record in the patented file of this patent or the original patent.

UNITED STATES PATENTS

| | | | |
|---|---|---|---|
| 2,990,516 | 6/1961 | Johnannessel | 330—10 |
| 3,541,461 | 11/1970 | Brendzel | 330—10 |
| 3,551,851 | 12/1970 | Engel | 330—10 X |
| 3,585,517 | 6/1971 | Herbert | 330—10 |
| 2,757,331 | 7/1956 | Patruskey et al. | 321—40 |
| 3,112,365 | 12/1963 | Kihara | 179—1 |
| 3,019,355 | 1/1962 | Morgan | 307—293 |
| 3,309,527 | 3/1967 | Walker | 307—240 |
| 3,400,334 | 9/1968 | Ross et al. | 330—10 |

OTHER REFERENCES

Radio-Electronics, July 1965, "The Two-State Amplifier," by Norman Crowhurst, pp. 54–56, 330–10(A).

Electro-Technology, June 1968, "Staggered Phase Technique Shrinks Power Conditioners," pp. 55–58.

NATHAN KAUFMAN, Primary Examiner

U.S. Cl. X.R.

330—12, 20, 24; 307—253